March 1, 1932.  A. W. FREHSE  1,848,059
BRAKE ANCHOR
Filed May 23, 1929
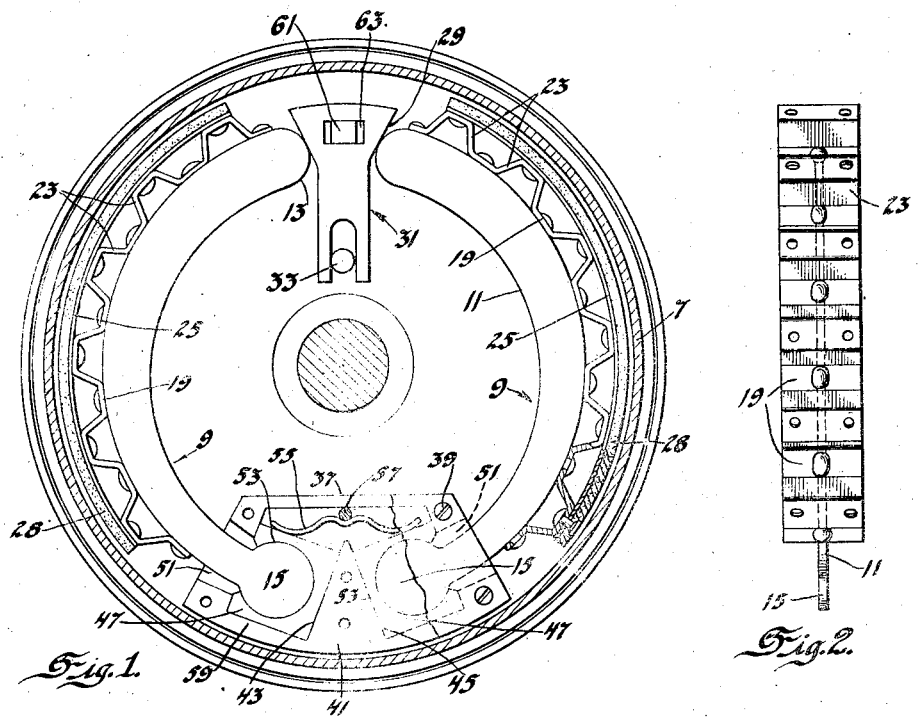
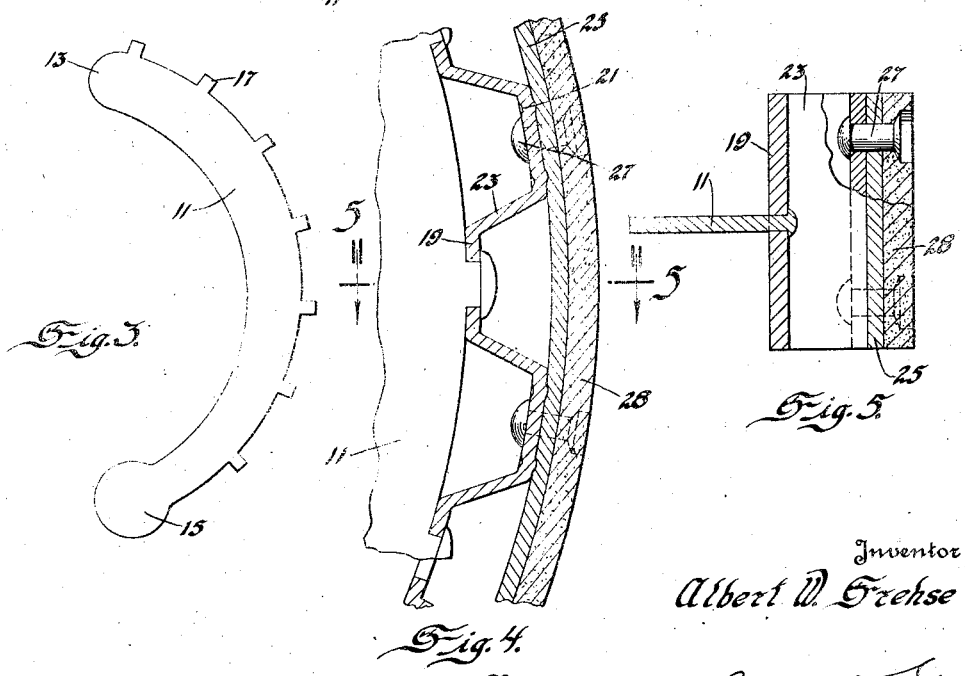
Inventor
Albert W. Frehse
By Blackmore, Spencer & Hulbert
Attorneys Patented Mar. 1, 1932

1,848,059

UNITED STATES PATENT OFFICE

ALBERT W. FREHSE, OF DETROIT, MICHIGAN, ASSIGNOR TO GENERAL MOTORS CORPORATION, OF DETROIT, MICHIGAN, A CORPORATION OF DELAWARE

BRAKE ANCHOR

Application filed May 23, 1929. Serial No. 365,364.

This invention relates to brakes and has been designed as an improved friction brake for vehicles.

An object of the invention is to provide an improved brake shoe which is to engage the brake drum and check its rotation.

Another object is the construction of a shoe having an improved and simple anchorage.

Another object is to make a shoe wherein the distortion due to heat is reduced to a minimum.

Other objects and advantages will be understood from the following description.

In the drawings, Figure 1 is a view in elevation of the shoes assembled in the drum. Figure 2 is a view in elevation of a part of a shoe. Figure 3 is a view in side elevation of another part. Figure 4 is a view on an enlarged scale of a portion of a shoe with the parts assembled. Figure 5 is a section on line 5—5 of Figure 4.

Referring by reference characters to the drawings, numeral 7 represents the flange of the drum, this being the drum which is usually associated with the vehicle wheel, and 9—9 are the shoes which are to engage the surface, 7, and check the rotation of the drum.

Each shoe, 9, is comprised of a beam or stiffening member, 11. The member, 11, is a flat plate and of curved shape. One end of each shoe is rounded, as at 13, and the other end is formed, as a flat disc, 15, of circular outline. This disc portion, 15, is to serve as an anchor. In this way the usual anchoring pin may be avoided. On the outer periphery of the beam portion, 11, are a plurality of radial lugs, 17. These lugs are received in openings in the inner flat portions, 19, of a thin metal ribbon having, alternating with parts 19, outer flat portions, 21, with angular parts, 23, therebetween. The lugs 17, after being projected through the openings of the ribbon are headed to serve as a rivet to secure the ribbon to the beam, 11. A lining carrying strip, 25, preferably of the same thickness as the ribbon, is riveted to the parts, 21, by rivets, 27. These rivets may also serve to secure the lining, 28.

The adjacent rounded ends, 13, are engaged by the opposite wedged surface, 29, of a brake operating member, 31. This operating member is slidable on a pin, 33, and in so sliding, it expands the adjacent ends of the shoes, 9, into engagement with the drum in an obvious manner. The member, 31, is also free to rotate about pin, 33, with the result that the applied pressure on the two shoes may be equalized.

At 37 is a hollow block, which may be secured by fastening means, 39, in fixed position. Within the block there is a wedge-shaped member, 41, having surfaces 43 and 45. The recess within the block receives bearings, 47, which are slidable on the surfaces, 43 and 45. The bearings have openings, 51, communicating with recesses, 53, shaped and dimensioned to correspond with the discs, 15. The planes of surfaces, 43 and 45, are substantially at right angles to the direction of thrust at the anchors of the brake shoes. A flat spring, 55, has its ends engaging the two bearing members, 47, and is held in position by a pin, 57. The spring normally presses the two bearing members, 47, outwardly and into contact with limiting surfaces, 59.

The operation of the brake will be obvious. As the wedge member 31, is moved inwardly in a radial direction by the engagement of a member, 61, in a slot, 63, the shoes are spread apart and rotate about their disc anchors, 15, into contact with the drum. The heat developed in part 25 is not readily transmitted to the beam member, 11, since the connection between these parts by ribbon member is such as to provide for free radiation. The sliding anchorage permits the shoes to readily conform to the shape of the drum. Furthermore, if the shoe beam becomes distorted to any extent, from the influence of heat, the sliding anchorage is a more advantageous arrangement than a fixed anchorage. If the anchorage were fixed, the curling shoe would tend to fail to contact with the drum in the region adjacent the brake applying part. As a result of the sliding anchorage it is possible, even under such circumstances, for the member, 47, to slide inwardly against the tension of spring, 55, to provide a better and more uniform contact with the drum even in the case of shoe distortion.

I claim:

1. In a brake, a brake shoe including a flat beam, said beam having at one end a flat disc, circular in outline, a socket member shaped to receive said disc to provide anchorage for said shoe.

2. In combination, a pair of shoes, means to separate one pair of adjacent ends of said shoes, a block fixed in position adjacent the other pair of adjacent ends, said block having angular faces, bearings in said block slidably engaging said faces, said shoes having at their opposite ends flat discs, circular in outline, and said bearings having recesses shaped to receive said discs.

3. A brake shoe having a curved lining carrying flange and a flat curved beam, the plane of the beam being at right angles to the plane of the lining carrying flange, an angularly bent metallic ribbon having alternating spaced surfaces engaging the outer edge of the beam and the inner surface of the flange and means to secure said ribbon to said flange and the beam, said shoe having an anchored end in the form of a disc, circular in outline, said disc being formed on the end of the beam of said shoe.

4. In combination, a brake shoe having at one end a flat anchoring disc, circular in outline, a bearing having a recess to receive said disc, a fixed block having a surface to slidably receive said bearing, and means to limit the sliding movement of said bearing on said surface.

5. The invention defined by claim 4, said last named surface being in a plane, substantially at right angles to the thrust of said shoe.

6. In combination, a brake shoe having at one end a flat anchoring disc, circular in outline, a bearing having a recess to receive said disc, a fixed block having a surface to slidably receive said bearing, said surface being substantially at right angles to the thrust of said shoe, means in said block to limit the movement of said bearing member, and yielding means normally exerting pressure on said bearing in a direction to move said bearing toward said limiting means.

In testimony whereof I affix my signature.

ALBERT W. FREHSE.